(12) United States Patent
Lauer

(10) Patent No.: US 7,060,938 B1
(45) Date of Patent: Jun. 13, 2006

(54) DOUBLE-DISK ASSEMBLY FOR A CIGAR OR CIGARETTE LIGHTER

(75) Inventor: Ralph Lauer, Idstein (DE)

(73) Assignee: Casco Products Corporation, Shelton, CT (US)

( * ) Notice: Subject to any disclaimer, the term of this patent is extended or adjusted under 35 U.S.C. 154(b) by 0 days.

(21) Appl. No.: 11/064,508

(22) Filed: Feb. 22, 2005

(51) Int. Cl.
*F23Q 7/00* (2006.01)

(52) U.S. Cl. .................. 219/265; 219/267; 219/270; 337/344

(58) Field of Classification Search ............. 219/265, 219/270, 263, 267, 390; 392/390; 337/333
See application file for complete search history.

(56) References Cited

U.S. PATENT DOCUMENTS

| | | | |
|---|---|---|---|
| 2,137,195 A | | 11/1938 | Cohen |
| 2,220,978 A | * | 11/1940 | Shakespeare et al. ........ 219/265 |
| 2,292,408 A | * | 8/1942 | Spencer ...................... 219/262 |
| 4,053,859 A | | 10/1977 | Hollweck |
| 4,230,931 A | * | 10/1980 | Horwitt et al. ............. 219/265 |
| 4,449,036 A | | 5/1984 | Seibel et al. |
| 4,703,301 A | | 10/1987 | Hollweck et al. |
| 5,144,111 A | | 9/1992 | Von Gaisberg et al. |
| 5,233,162 A | | 8/1993 | Von Gaisberg et al. |
| 6,054,916 A | * | 4/2000 | Hofsass ...................... 337/344 |
| 2002/0044039 A1 | * | 4/2002 | Takeda ....................... 337/377 |

* cited by examiner

*Primary Examiner*—Robin Evans
*Assistant Examiner*—Vinod Patel
(74) *Attorney, Agent, or Firm*—Mitchell Bittman; Louis Dujmich

(57) ABSTRACT

A double-element assembly for a cigar lighter, having a bimetallic disk, and a metal disk that is not bimetallic, the disks being riveted to one another in a center region of each disk.

5 Claims, 4 Drawing Sheets

DOUBLE-DISK ASSEMBLY FOR A CIGAR OR CIGARETTE LIGHTER

BACKGROUND OF THE INVENTION

The present invention relates to a heating element of a cigar lighter, and more particularly to a thermally controlled switching element in a cigar or cigarette lighter.

Various lighters are known for automotive applications, including lighters shown in the following U.S. Pat. Nos. 4,168,422; 4,204,109; 4,207,455; 4,177,374; 5,998,763; and 4,230,931. U.S. Pat. No. 6,740,850 discloses an electric cigar lighter assembly that has a lighter heating assembly 100 that plugs into a socket assembly 300. The lighter assembly 100 includes a heating element 122 and a switch. The switch is comprised of contacts 142 and 154. FIG. 1 shows the lighter assembly 100 inserted into the socket 300 but un-energized because the contacts 142, 154 are not in electrical contact. When the knob 102 is pushed in, thus forcing the lighter 100 into the socket assembly 300 further, the contacts 142, 154 engage in the heater 122 is electrically energized. After a period of time, a bimetallic disk 146 heats up and moves from the position shown in FIG. 1B to the position shown in FIG. 1 by the bold lines, thereby forcing the lighter 100 outwardly and disengaging the contacts 142 and 154, thus de-energizing the heater 122. A problem with this construction is that the single bimetallic disk 146 is used to cause the lighter to pop-up when the heating element reaches a desired temperature. The problem with such a single bimetallic disk is that it is difficult to provide controlled upper and lower limits of a temperature window for operation of the bimetallic disk.

U.S. Pat. No. 2,137,195 teaches a cigar lighter that has a heating element carried within and connected to a metal cup and also to a central stud. The cup is one of two contacts that are brought together to place the heating element in the energizing circuit. The other contact, however, is not a thermostatic element, but another part carried by the thermostatic element and, in particular, a permanently dished metal plate. This plate is centrally riveted to the center of the thermostatic element which is normally uniplanar. The heat responsive deformation of the thermostatic element pushes against the metal plate to force the lighter assembly out of the socket.

SUMMARY OF THE INVENTION

Accordingly, it is an object of the present invention to provide an electric cigar lighter, particularly a cigar lighter for an automobile, having a pop-up double element assembly made up of a bimetallic element and a metal element that is not bimetallic. The elements are attached to one another at a center of each element. The elements can be configured as curved disks and are attached to each other by, for example, riveting or welding.

The bimetallic disk as a dished-shape, i.e., is curved when viewed in cross-section, and the metal disk which is not bimetallic is also dished. The disks are arranged so that in a normal, non-use state of the lighter the dish-shaped disks curve in opposite directions. The bimetallic disk is arranged adjacent the metal disk. The bimetallic disk curves away from the metal disk and the metal disk curves away from the bimetallic disk so that the two disks touch one another in a region of their apex. At this contact region, the disks are connected, for example, by a rivet.

The periphery of the metal disk is mounted to the lighter structure so that movement of the metal disk also moves the upper bimetallic disk.

Other features and advantages of the present invention will become apparent from the following description of the invention which refers to the accompanying drawings.

DETAILED DESCRIPTION OF THE INVENTION

Figure 1:
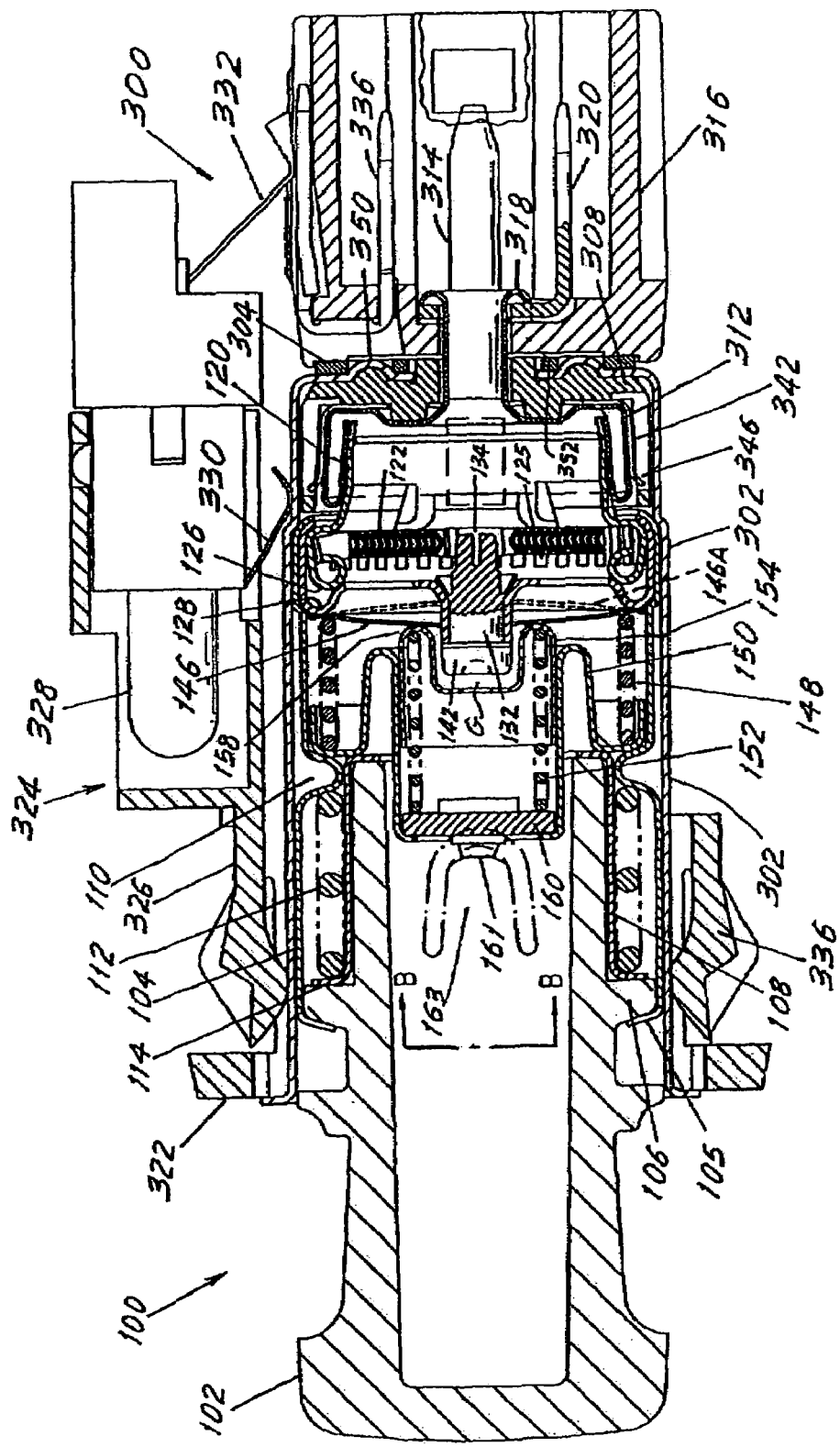
FIG. 1 is a cut-away view of a prior art lighter assembly.
Figure 1B:
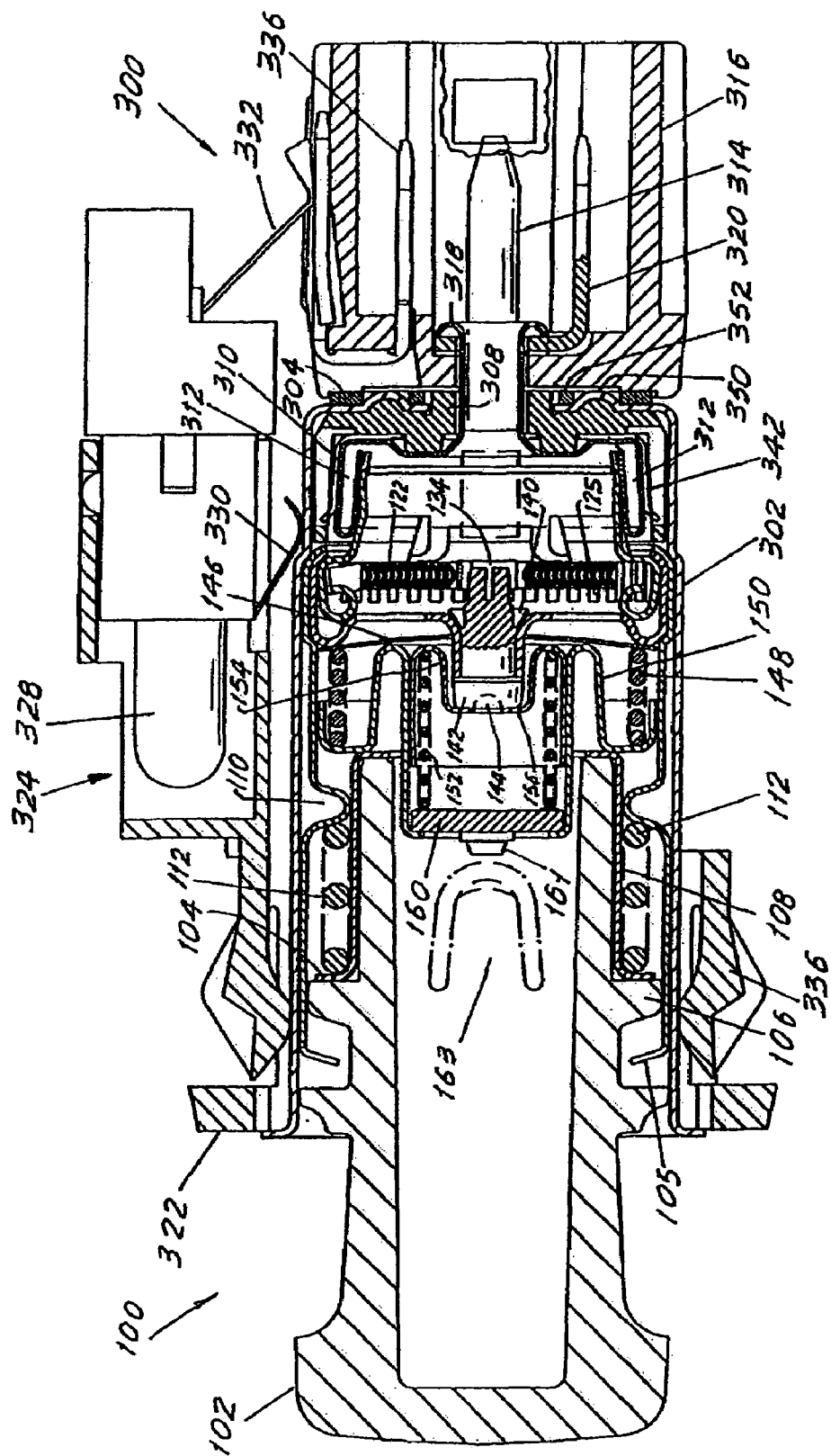
FIG. 1B is the same view as in FIG. 1, but showing the lighter heating unit assembly in an electrically engaged position.

As previously mentioned, FIGS. 1 and 1B show the components of a prior art electric cigar lighter for an automobile.

FIGS. 2–5 show the two disk assembly of the present invention. The two disk assembly of the present invention would be substituted for the element 146 shown in FIGS. 1 and 1B. Of course, FIGS. 1 and 1B are only an example of one type of cigar lighter in which the invention can be used. The specific components, other than the double disk element are not of concern in the presently claimed invention and can be modified as within the purview of those skilled in the art.

Figure 2:
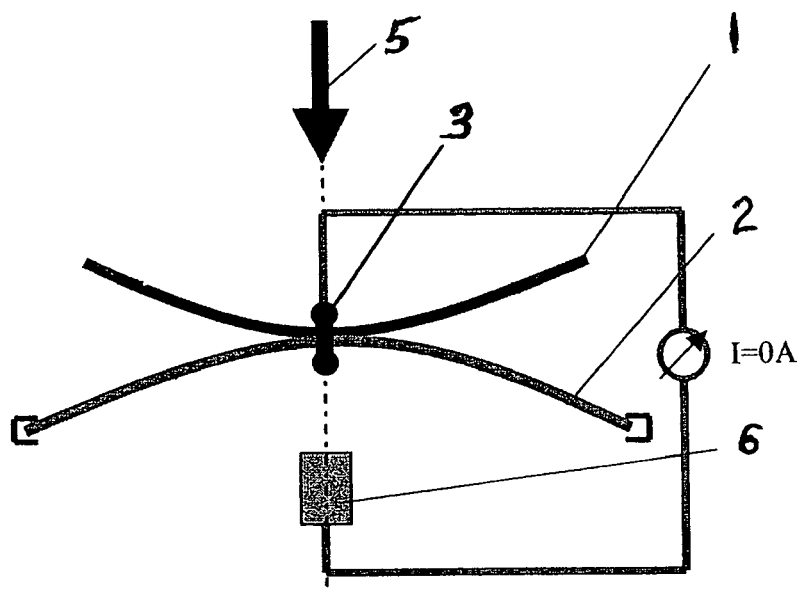
FIG. 2 is a schematic section through a double disk element pursuant to the present invention in a first, rest position.

As shown in FIG. 2, the double element assembly of the present invention includes a bimetallic disk 1 and a metal disk 2. The metal disk 2 is dome-shaped and the bimetallic disk 1 has an inverted dome shape. The disks 1, 2 are connected to the other by a rivet 3. It is understood that any type of connection is possible which allows the two disks to be connected only at their apex region and leaving the remaining regions of the disks independently movable from one another. The outer periphery of the metal disk 2 is attached to the cigar lighter itself.

Figure 3:
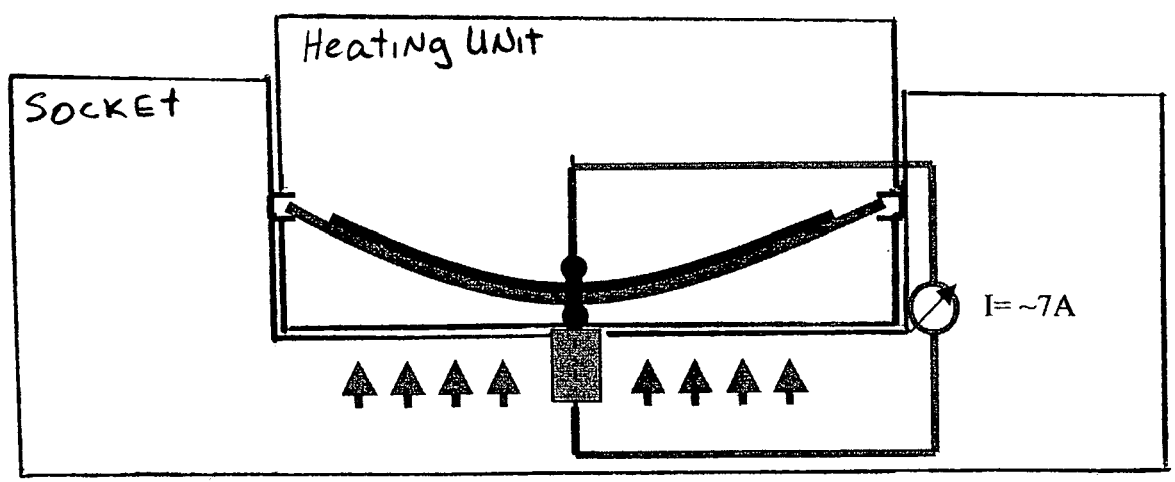
FIG. 3 is a view as in FIG. 2 in a second, initial heating position.

In an at rest state or non-use state of the cigar lighter, the disks 1, 2 rest as shown in FIG. 2. When a force 5 is used to press the heating element of the lighter into the socket, the metal disk 2 flips so that the two disks 1, 2 assume the same shape, as shown in FIG. 3. In this position, the rivet 3 engages a contact 6 that closes an electric circuit that causes current to flow which in turn heats up the metal disk 2 and the bimetallic disk 1.

Figure 4:
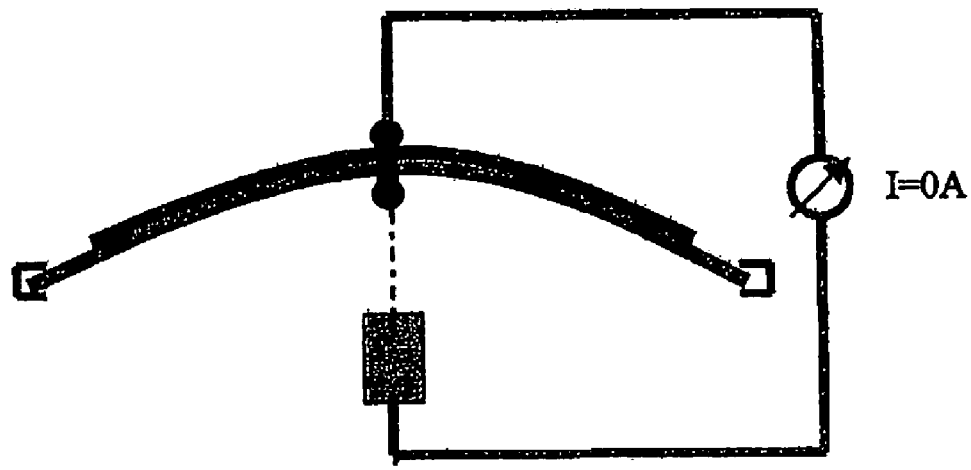
FIG. 4 is a view as in FIG. 2 of the disks in a heated position.

When the temperature of the bimetallic disk 1 exceeds a defined temperature, for example, 90° C., the bimetallic disk 1 flips and due to the rivet 3 connection to the metal disk 2, pulls the metal disk 2 along so that the rivet 3 disengages from the contact 6, as shown in FIG. 4, and opens the circuit. This also forces the lighter assembly to pop a defined distance out of the socket, alerting the user the lighter is ready to use. Once the circuit is open the disks no longer heat up.

Figure 5:
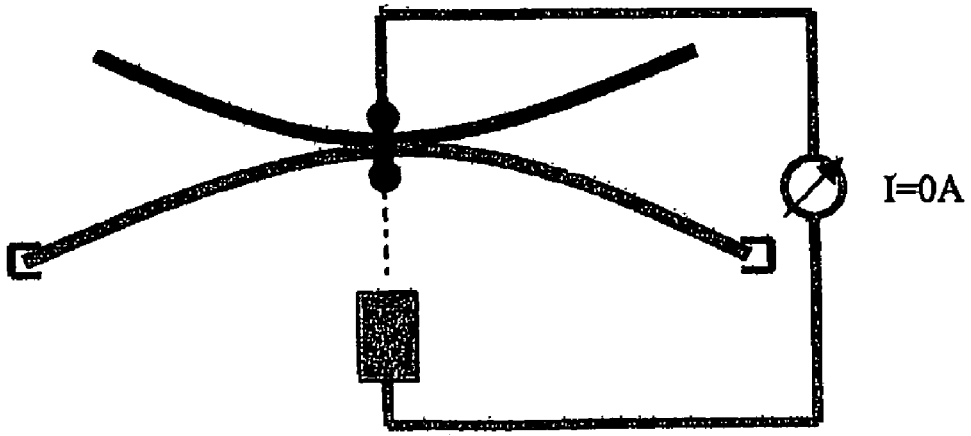
FIG. 5 is a view as in FIG. 2 of the disks in a cool down phase.

After the bimetallic disk 1 has cooled down, it again flips to its initial at rest state as shown in FIG. 5. This cool down flip occurs at a temperature below, for example, 60° C.

The present invention allows a well-defined exemplary temperature window of, for example, between 60° C. and 90° C. for operation of the bimetallic disk 1 and also reduces the effect of the bimetallic disk at low temperatures on the overall lighter assembly. It is understood that the temperatures given are only examples and that any desired temperatures can be used to form the temperature window. As shown in FIGS. 2 and 3, upon initial activation of the lighter, it is the metal disk 2 that is inverted, not the bimetallic disk. The bimetallic disk is not flipped by a user-imposed force. Furthermore, the additional metal disk 2 acts as a heat shield which increases the life of the bimetallic disk 1. It is of course understood that the temperature window can be changed as desired by the specific construction of the bimetallic disk, as is known in the art.

FIG. 3 also schematically shows the socket and the heating unit, it being understood by one of skill in the art that the prior art device of FIGS. 1 and 1B would be appropriately modified to receive the double disk element assembly.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A cigar lighter assembly comprising:
    a heating unit and a cigar lighter socket in which the heating unit is slideably received,
        the heating unit comprising a switch and a double-element assembly for opening the switch when an electrical heating element reaches a predetermined temperature,
        the socket including a socket housing sized so as to receive the heating unit therein,
    the double-element assembly including
        a bimetallic element having a first curvature at a first temperature,
        a metal element that is not bimetallic having a second curvature at the first temperature that is opposite the first curvature of the bimetallic element, and
        wherein the bimetallic element and the metal element are attached to one another at substantially a center of each element, the bimetallic element and the metal element being movable so that the metallic element is bendable into a position such that the two elements are curved to conform to each other when being heated by the heating unit to a second higher temperature, the bimetallic element reversing its curvature at the second temperature and pulling the metal element with it to open the switch, the bimetallic element thereafter on cooling back down to the first temperature assuming its first curvature opposite the second curvature of the metal element.

2. The cigar lighter assembly according to claim 1, wherein the bimetallic and metal elements are disks.

3. The cigar lighter according to claim 2, wherein the bimetallic disk has a smaller area than the metal disk.

4. The cigar lighter assembly according to claim 2, wherein the bimetallic disk is riveted to the metal disk.

5. The cigar lighter assembly according to claim 1, wherein the bimetallic disk is welded to the metal disk.

\* \* \* \* \*